US007532604B2

(12) United States Patent
Eglin

(10) Patent No.: US 7,532,604 B2
(45) Date of Patent: May 12, 2009

(54) LOCAL AREA NETWORK WITH WIRELESS CLIENT FREEDOM OF MOVEMENT

(75) Inventor: Matthew George Eglin, Ottawa (CA)

(73) Assignee: Siemens Canada Limited, Mississauga, Ontario ( * ) Notice: Subject to any disclaimer, the term of this patent is extended or adjusted under 35 U.S.C. 154(b) by 1314 days.

(21) Appl. No.: 10/140,629

(22) Filed: May 8, 2002

(65) Prior Publication Data

US 2003/0210671 A1    Nov. 13, 2003

(51) Int. Cl.
*H04W 4/00* (2006.01)
(52) U.S. Cl. .................. 370/338; 370/389; 370/401
(58) Field of Classification Search .................. None
See application file for complete search history.

(56) References Cited

U.S. PATENT DOCUMENTS

| 5,717,737 | A  |   | 2/1998  | Doviak et al. ........... 379/58 |
|---|---|---|---|---|
| 6,198,920 | B1 |   | 3/2001  | Doviak et al. ........... 455/426 |
| 6,253,064 | B1 | * | 6/2001  | Monroe .................. 455/66.1 |
| 6,847,620 | B1 | * | 1/2005  | Meier .................... 370/328 |
| 6,876,642 | B1 | * | 4/2005  | Adams et al. ........... 370/338 |
| 6,937,574 | B1 | * | 8/2005  | Delaney et al. ......... 370/254 |
| 6,990,338 | B2 | * | 1/2006  | Miller et al. ........... 455/431 |
| 7,099,339 | B1 |   | 8/2006  | Wang et al. |
| 2002/0009078 | A1 | * | 1/2002 | Wilson et al. .......... 370/389 |
| 2002/0041568 | A1 | * | 4/2002 | Bender ................... 370/238 |
| 2002/0061758 | A1 | * | 5/2002 | Zarlengo et al. ........ 455/517 |
| 2002/0087992 | A1 |   | 7/2002 | Bengeult et al. |
| 2002/0159407 | A1 | * | 10/2002 | Carrafiello et al. ....... 370/328 |
| 2002/0191567 | A1 |   | 12/2002 | Famolari et al. |
| 2002/0191572 | A1 | * | 12/2002 | Weinstein et al. ........ 370/338 |
| 2003/0142651 | A1 | * | 7/2003 | Matta et al. ............. 370/338 |
| 2003/0198208 | A1 | * | 10/2003 | Koos et al. ............. 370/338 |
| 2006/0190586 | A1 | * | 8/2006 | Stewart et al. .......... 709/223 |

FOREIGN PATENT DOCUMENTS

WO    WO 02/43348 A1    5/2002

OTHER PUBLICATIONS

White Pater: "IP Mobility vs. Session Mobility", Columbitech, 2001, http://www.columbitech.com/documents/Columbitech_IP_mobility_vs_session_mobility_WhitePaper.pdf.
White Pater: "Columbitech Wireless VPNTM Version 1.4", Columbitech, May 5, 2003, http://www.columbitech.com/documents/ColumbitechWVPNTechnicalDescription.pdf.

* cited by examiner

*Primary Examiner*—Bob A Phunkulh

(57) ABSTRACT

A network with wireless connectivity, a vehicle connected to and including the network and a method of managing network data flow. The network includes multiple wireless access points, each connected to an Ethernet aggregation switch. Each Ethernet aggregation switch is virtual local area network (VLAN) aware and matches client traffic from connected access points with access VLANs. A virtual network switch maintains an association table between access VLANs and core VLANs. The virtual network switch uses the association table to manage free-form client traffic between mobile stations at access VLANs at connected Ethernet aggregation switches and appropriate core VLANs. The vehicle, including the network, may be a train with access points located trackside connecting train passengers to a public network, e.g., the Internet. Wireless devices on the train may also connect to an on-board such network.

16 Claims, 6 Drawing Sheets

LOCAL AREA NETWORK WITH WIRELESS CLIENT FREEDOM OF MOVEMENT

BACKGROUND OF THE INVENTION

1. Field of the Invention

The present invention is related to a local area network (LAN) and more particularly, to a LAN with connected wireless devices.

2. Background Description

The Institute of Electrical and Electronics Engineers (IEEE) wireless protocol designated 802.11b is an Ethernet local area network (LAN) variant. Ethernet technology has shown an amazing ability to adapt to new requirements, evolving from a simple 10 Mbps bus to gigabit full-duplex switched networks and to wireless LANs. Ethernet is well understood and there is a wealth of experience with cost reduction and integration of Ethernet devices. Some current Ethernet interface cards (10BaseT) retail at less than $10. 802.11b wireless LAN (WLAN) card technology is subject to the same economy of scale and prices have fallen to less than 30% of their relatively recent original prices. Given its track record, Ethernet is a low-risk, extensible technology suited, for example, to address challenges in wide-area mobility.

Consequently, WLAN technology has been characterized as a disruptive technology. In other words, WLAN technology may change paradigms and lead to unexpected and unpredictable market developments. Past examples of disruptive technologies are the telephone, the personal computer (PC) and the Internet. Today, WLANs are becoming ubiquitous offering cheap solutions for both home and office networks. Currently however, there are three major limitations on WLAN technology: speed, range and security.

The 802.11b standard supports speeds of up to 11 Mbs. However, 802.11a and 802.11g are promising to deliver much higher speeds. Although range is limited, typically, to about fifty meters (50 m) outdoors, tests have demonstrated a range capability of up to 20 miles using directional antennas. Work is continuing to expand the coverage of the wireless base stations. Wired Equivalent Privacy (WEP) for wireless networks has proven far less secure than was intended. The security limitations of WEP are now well understood and work is on-going to enhance these protocols to improve the security of wireless interfaces.

The IEEE 802.1Q virtual LAN (VLAN) protocol defines interoperability operation of VLAN bridges. 802.1Q permits the definition, operation and administration of VLAN topologies within a bridged LAN infrastructure, such that LANs of all types may be connected together by Media Access Control (MAC) bridges.

Heretofore, these Ethernet LAN variants have been relatively rigidly architected. Once attached or connected, a device could communicate freely with other attached devices. If after sending a request, however, the connection is lost prior to receiving a response, the response was lost. Once reconnected, whether to the same or a different port and, even prior to arrival of the response, the response was lost and the request had to be sent anew. This is still the case for state of the art VLANs and even for devices wirelessly connected to such a VLAN. So, if a wireless device that is connected to a VLAN through an access point leaves the access point's reception area, the wireless device must re-establish communications. It must reestablish communications even if it never leaves the overall LAN reception area, i.e., the area covered by all connected access points, and even if it remains in the reception area of another connected access point.

Thus, there is a need for a wireless LAN wherein a wirelessly connected device can roam freely throughout the reception area of all connected access points over a wide area network.

SUMMARY OF THE INVENTION

It is a purpose of the invention to improve user mobility on wireless networks;

It is yet another purpose of the invention to expand wireless device network connectivity availability;

It is yet another purpose of the invention to freely allow network clients wirelessly connected to a network to roam beyond the range of a currently connected access point while maintaining a network connection.

The present invention relates to a network with wireless connectivity, a vehicle connected to and including the network and a method of managing network data flow. The network includes multiple wireless access points, each connected to an Ethernet aggregation switch. Each Ethernet aggregation switch is virtual local area network (VLAN) aware and matches client traffic from connected access points with access VLANs. A virtual network switch maintains an association table between access VLANs and core VLANs. The virtual network switch uses the association table to manage free-form client traffic between mobile stations at access VLANs at connected Ethernet aggregation switches and appropriate core VLANs. The vehicle, including the network, may be a train with access points located trackside connecting train passengers to a public network, e.g., the Internet. Wireless devices on the train may also connect to an on-board such network.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
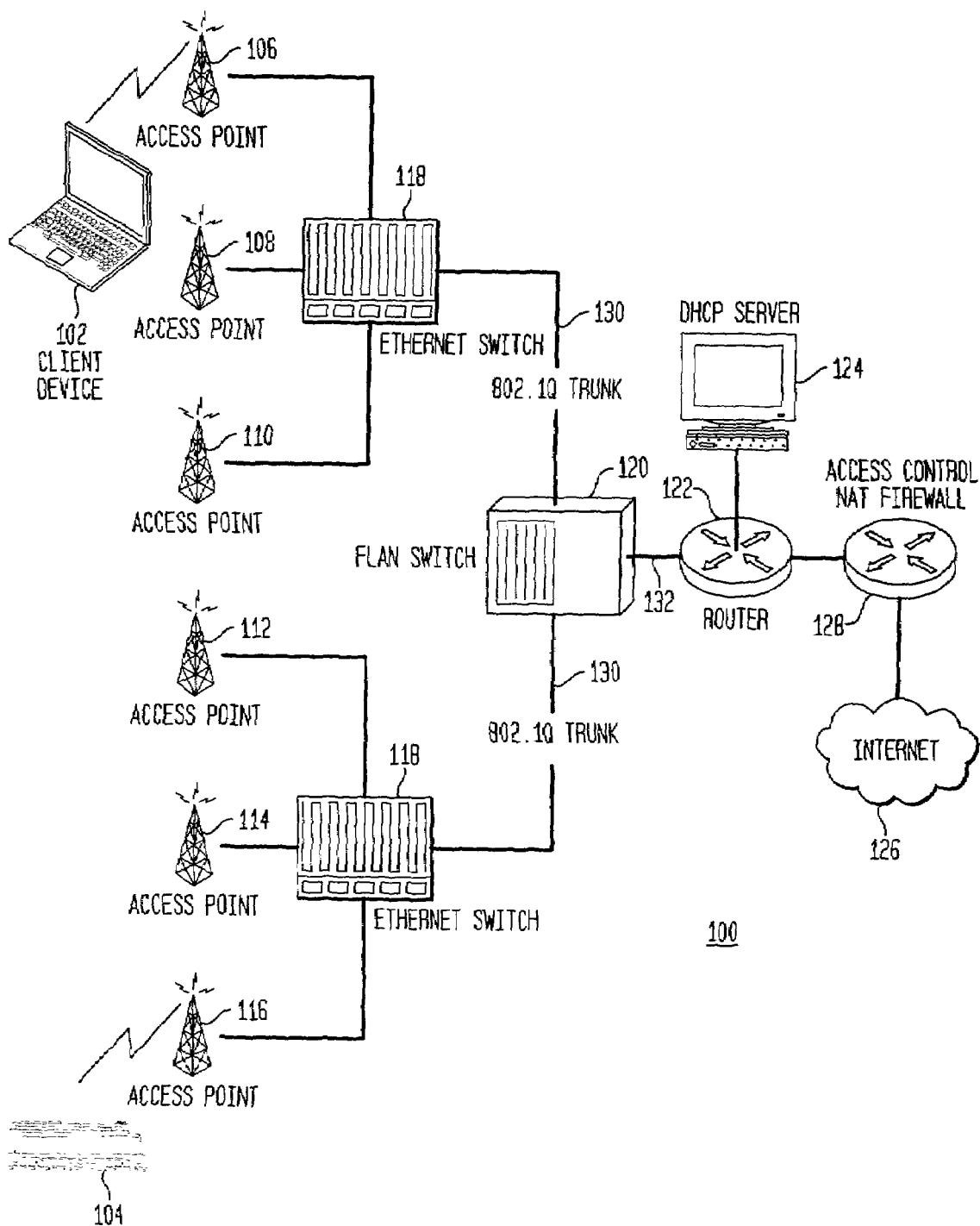
FIG. 1 shows an example of a preferred embodiment free-form virtual local area network (FLAN)

FIG. 1 shows an example of a preferred embodiment network 100 with wireless access capability, i.e., a free-form virtual local area network (FLAN) 100 wherein clients at mobile stations, once connected, roam freely within the wireless coverage area and are seamlessly swapped from one access point to another access point as they roam. Mobile stations (MS) 102, 104, which may be wireless client devices are connected by wireless data links to one of numerous access points (APs) 106, 108, 110, 112, 114, 116. Examples of such mobile stations 102, 104 or wireless client devices may include what is known as a personal digital assistant (PDA), a cellular phone (in particular an Internet capable cellular phone), a notebook computer/wireless tablet, a desktop computer or, a vehicle such as a train with an onboard network that has wireless communications capability as further described hereinbelow. Each AP 106, 108, 110, 112, 114, 116 is connected to an Ethernet aggregation switch 118. Each aggregation switch 118 aggregates all client traffic from connected APs 106, 108, 110, 112, 114, 116, passing it upstream to a preferred free-form virtual network switch or FLAN switch 120. Although not shown in this example, a preferred embodiment network may include more than one layer of aggregation switches 118 and/or FLAN switches 120.

The FLAN switch 120 may be connected through a typical router 122 to a typical Dynamic Host Configuration Protocol (DHCP) Server 124 and to a public network, e.g., to the Internet 126. For optional security, the router 122 also connects externally through a typical gateway 128 providing access control, network address translation (NAT) and a firewall. Each FLAN switch 120 may have multiple VLAN trunk interfaces 130, 132. FLAN switch interfaces 130 connected to aggregation switches 118 are referred to herein as access ports and packets arriving at access ports 130 are downstream packets. FLAN switch interfaces 132 connected to routers 122 are referred to herein as core ports and packets arriving at core ports 132 are upstream packets.

A VLAN-aware switch refers to an Ethernet switch that associates each frame with a single VLAN, e.g., Ethernet aggregation switch 118. A typical VLAN-aware switch includes an association table where each row contains a MAC address, a VLAN ID and a port. Thus, a VLAN aware switch forwards each frame to a MAC address based upon that single associated VLAN. By contrast, a preferred FLAN switch 120 associates each frame with two VLANs, one at an access port 130 and the other at a core port 132. To that end, each FLAN switch 120 maintains a port association table where each row contains a MAC address, an access port/VLAN pair, and a core port/VLAN pair. Further, aggregation switches 118 are configured to statically map each of the access ports to a different VLAN on its trunk port. Optionally, each aggregation switch 118 may share VLANs among multiple APs 106, 108, 110, 112, 114, 116, each one connected to a different port. VLAN sharing may be appropriate to minimize the number of VLAN IDs used. However, since there are more available VLAN IDs (4094) than ports on any one aggregation switch 118, normally, the FLAN switch 120 can reuse VLAN IDs on different aggregation switches 118 making sharing VLAN IDs unnecessary.

Preferably, the transmission/reception range of each access point 106, 108, 110, 112, 114, 116 is such that the coverage area for each particular access point overlaps other adjacent access points providing uninterrupted service for the intended coverage area. Thus, a mobile station 102, 104 connected to the network through one of the access points 106, 108, 110, 112, 114, 116 can pass between access point reception areas and remain in constant communication with the rest of FLAN 100. Furthermore, the FLAN switch 120 seamlessly receives data passed from connected mobile stations 102, 104, from the particular access point 106, 108, 110, 112, 114, 116, wirelessly receiving the data, from the aggregation switch 118 and, forwards received data to a desired destination over the Internet 126. Correspondingly, as data is received from the Internet 126, the FLAN switch 120 directs it to an appropriate mobile station 102, 104. FLAN switch 120 manages seamless communication between mobile stations 102, 104 and the Internet 126. When a mobile station 102, 104 moves from one access point reception area, e.g., 110, to another, e.g., 116, data transmission to/from the particular mobile station 102, 104 is automatically conveyed correctly over the rest of FLAN 100 without any manual intervention.

Figure 2A:
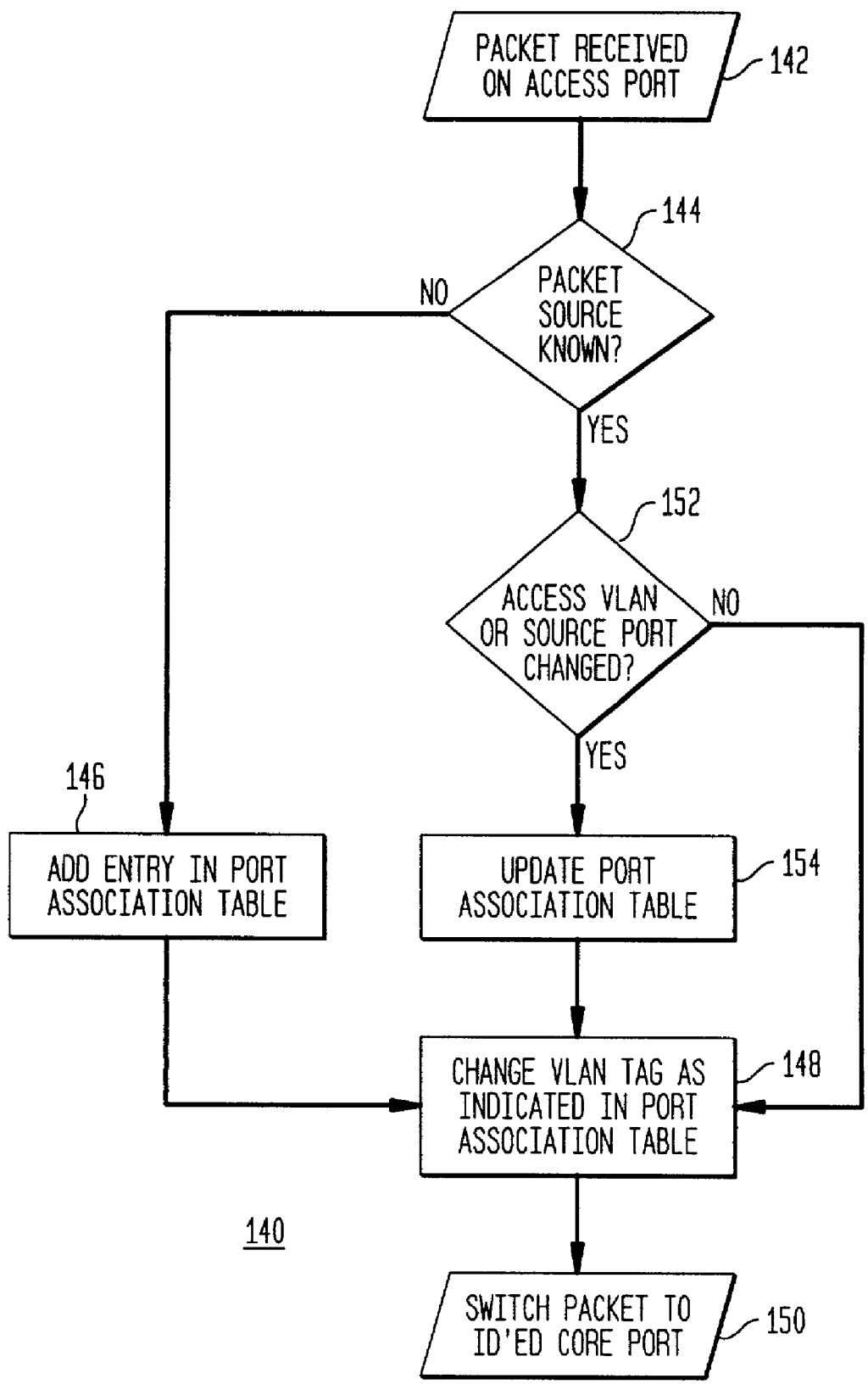
FIGS. 2A-B show flow diagrams for FLAN switch packet handling, downstream packets at access ports and upstream packets at core ports.
Figure 2B:
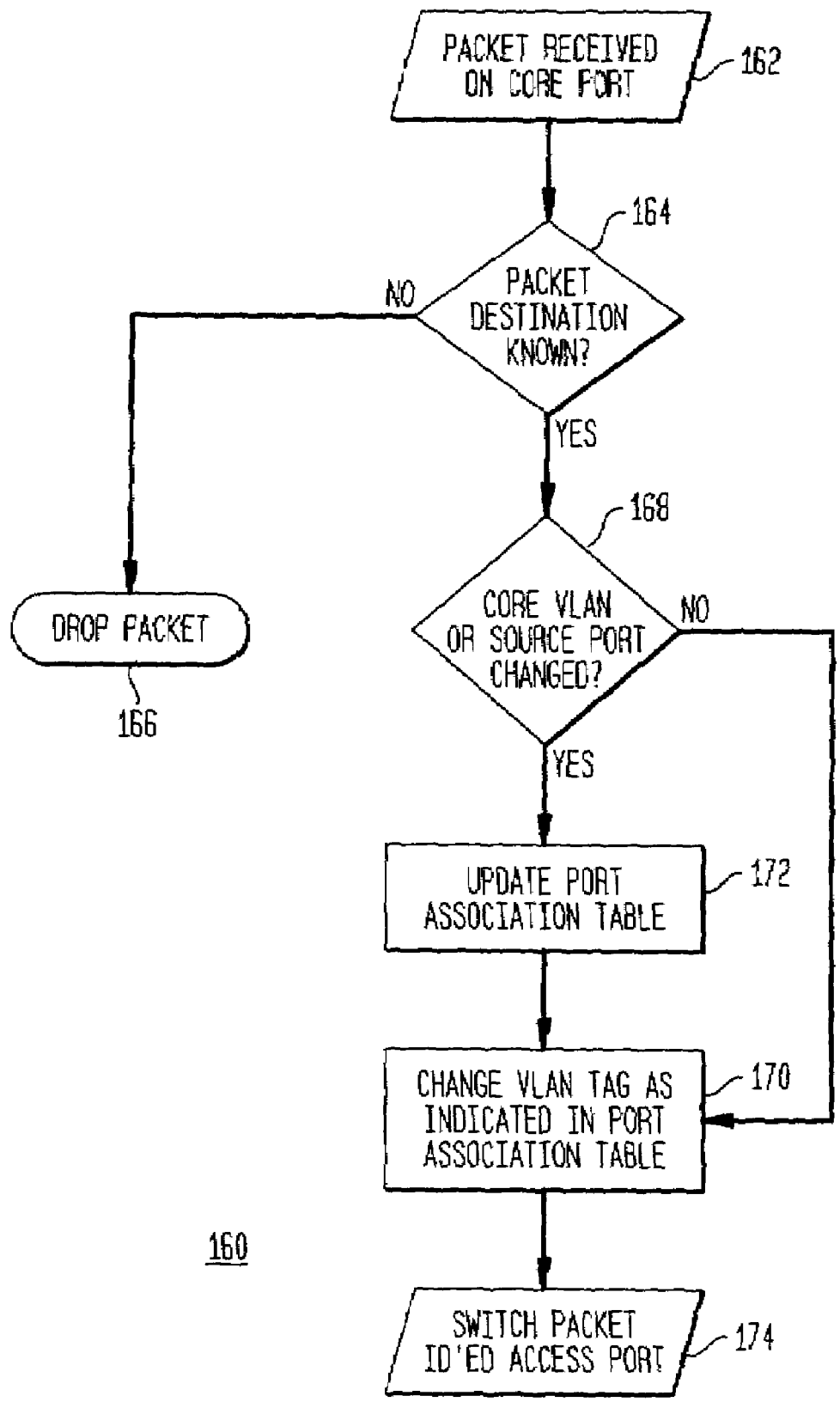

FIGS. 2A-B show flow diagrams for FLAN switch packet handling, downstream packets at access ports in flow diagram 140 and upstream packets at core ports in flow diagram 160 according to a preferred embodiment of the present invention. In FIG. 2A a downstream packet is received at an access port in step 142. If the downstream packet is a DHCP request, the router (122 in FIG. 1) acts as a DHCP relay agent and passes the packet to the DHCP Server 124. The DHCP Server 124, in addition to otherwise functioning as a normal DHCP Server, returns an address to the client, thereby configuring the client (e.g., MS 102, 104) and, switches to pass the traffic. The DHCP Server 124 can re-assign the client 102, 104 to a subnet that does not match a default VLAN assigned by the FLAN switch. When the MS 102, 104 is assigned to a subnet other than the default, the DHCP response is directed to the appropriate DHCP relay agent and on to the correct VLAN.

So, continuing in step 144 the port association table is checked to determine if the frame includes the MAC address of a currently connected MS 102, 104. If the packet does not originate from a current connection, then in step 146, a new connection is configured by entering the source MAC address, the access port/VLAN and default core port/VLAN information in the port association table. The default core port/VLAN is related to the incoming access port/VLAN. In step 148 the appropriate VLAN tag is changed to reflect the new default core VLAN for the downstream packet. Then, in step 150 the packet is switched to the default core port. If in step 144, however, the MAC address is identified as being to a currently connected MS 102, 104, then in step 152, the port association table is checked to determine if the access port/VLAN has changed. The access port/VLAN may change when the mobile station (e.g., 102) roams between AP reception areas, e.g., from first wireless access point 110 in FIG. 1 to another wireless access point 116. If the access port/VLAN is unchanged, then, continuing to step 148 the package is updated with the appropriate VLAN tag and in step 150 switched to the appropriate identified core port. Otherwise, if the access port/VLAN is changed in step 152; then, in step 154 the port association table is updated and in step 148 the VLAN tag is changed. Then, in step 150 the packet is switched to the appropriate identified core port.

Similarly, in step 162 of FIG. 2B, when a packet is received at a core port, in step 164 the packet frame is checked for a known destination. If the upstream packet is not directed to a known destination, then, it is not intended for any currently connected MS (e.g., 102 or 104) and, in step 166 the packet is dropped. If, however, the frame includes the destination MAC for a connected MS 102 or 104, the packet is for a known destination. Then, in step 168, the association table is checked to determine if the client association has changed from the most recent communication with that client. The association table may have changed because the identified core VLAN may have changed in a DHCP response or, because the MS 102, 104 has been assigned to a VLAN other than the default for its incoming port. Also, the VLAN and the port may both change if there is a fail over to a backup router. If the client association is unchanged, then, in step 170 the VLAN tag is changed to reflect the correct access VLAN for the packet. If the port association has changed, then in step 172 the port association table is updated before the VLAN tag is changed in step 170. Then, in step 174 the packet is switched to its access port.

So, for a packet traveling from a mobile station 102, 104 on layer 2 of the access network on the access side of the FLAN switch 120 in FIG. 1, the packet is assigned to a VLAN based on the mobile station's physical location in the network, i.e., the port for its connected Access Point 106, 108, 110, 112, 114, 116. A packet traveling to a mobile station on the core side of the FLAN switch 120 is assigned to a VLAN based on the mobile station's logical location in the network, or, equivalently, the mobile station's IP subnet.

Figure 3:
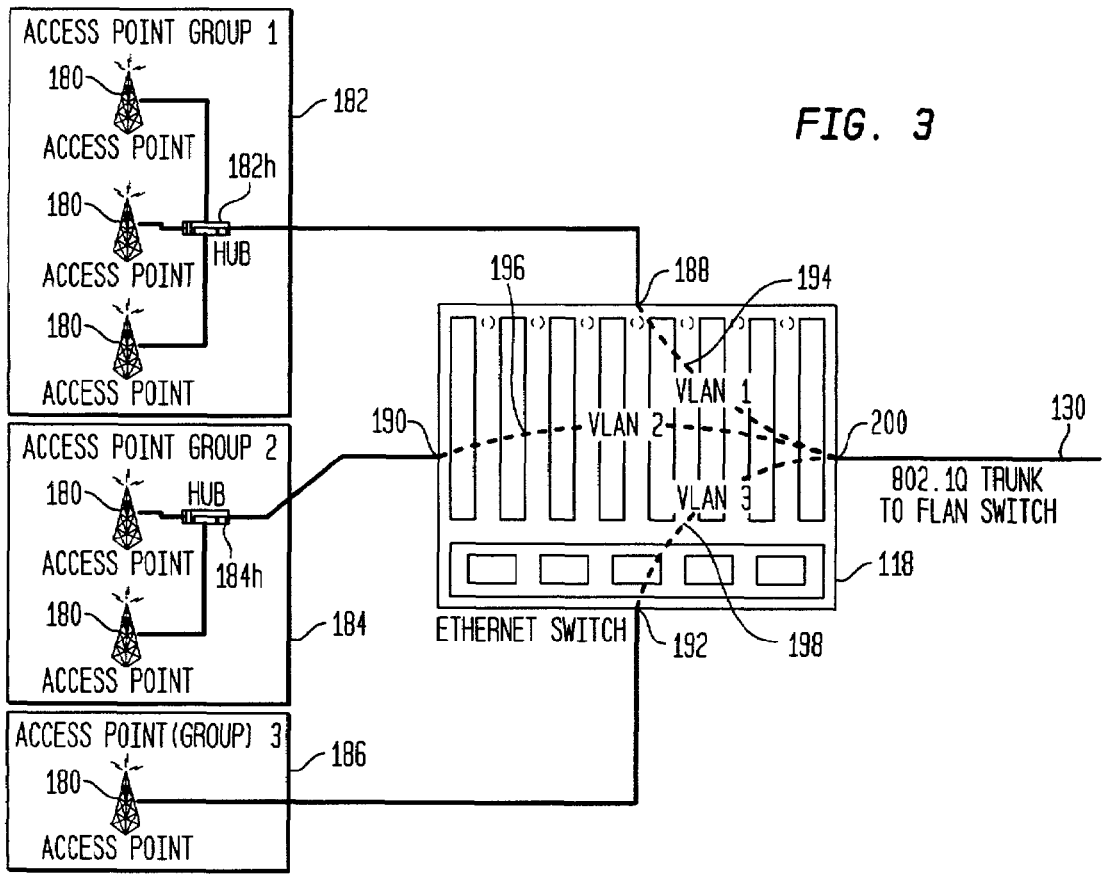
FIG. 3 is an example of VLAN configuration of an Ethernet aggregation switch.

FIG. 3 is an example of VLAN configuration of an Ethernet aggregation switch 118 according to a preferred embodiment of the present invention. Preferably, the FLAN switch meshes through VLAN trunk interface 130 with the VLAN configuration of Ethernet aggregation switches 118 and the router 122. In this example, APs 180 are grouped and each group 182, 184, 186 is connected through a hub 182h, 184h, if appropriate. Hubs 182h, 184h and individual APs (i.e. single AP groups 186) are connected to Ethernet aggregation switch ports 188, 190, 192. Each of these Ethernet switch ports 188, 190, 192 is mapped to an individual VLAN 194, 196, 198 on a VLAN trunk 200 connected to a FLAN access port. Each AP group 182, 184, 186 is mapped individually; there are no layer 2 connections between the AP groups 182, 184, 186 within the Ethernet aggregation switch 118.

Figure 4:
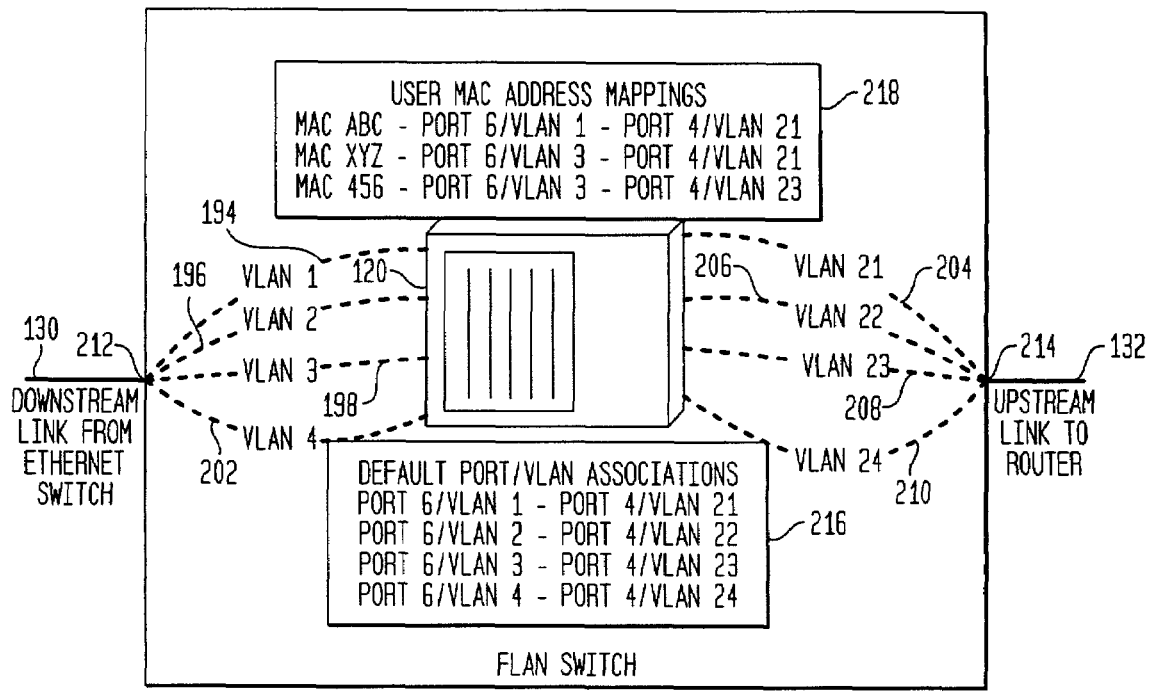
FIG. 4 shows an example of how a preferred FLAN switch preprogrammed with default relationships relates VLAN/ports.

FIG. 4 shows an example of how a preferred FLAN switch 120, preprogrammed with default relationships, relates VLANs 194, 196, 198, 202, 204, 206, 208, 210 on access port 212 and core port 214 of the FLAN switch 120. Default association table 216 provides default VLAN pairs as well as fixed core VLAN assignment for the FLAN switch 120. Devices that access special networks or devices requiring fixed IP addresses are assigned by MAC address in association table 218. These relationships may be stored in clear text configuration files and modified using any suitable text editor.

In this example, the FLAN switch 120 is aware of three mobile stations with MAC addresses ABC, XYZ and 456, all at Port 6, as indicated in association table 218. The VLAN ID numbers (e.g., 1, 2, 3, 4, 21, 22, 23, 24) are unique, but a port/VLAN tuple identifies the source and destination of a packet. Thus, VLAN ID numbers are freely reusable for all interfaces. In this example, devices ABC and 456 are in their default VLAN associations as indicated in default association table 216. By contrast, device XYZ is not in the default VLAN association for port 6. Instead, its association connects it to VLAN 204. So, for this example, device XYZ may have been moved from one Access Point Group to another.

Figure 5:
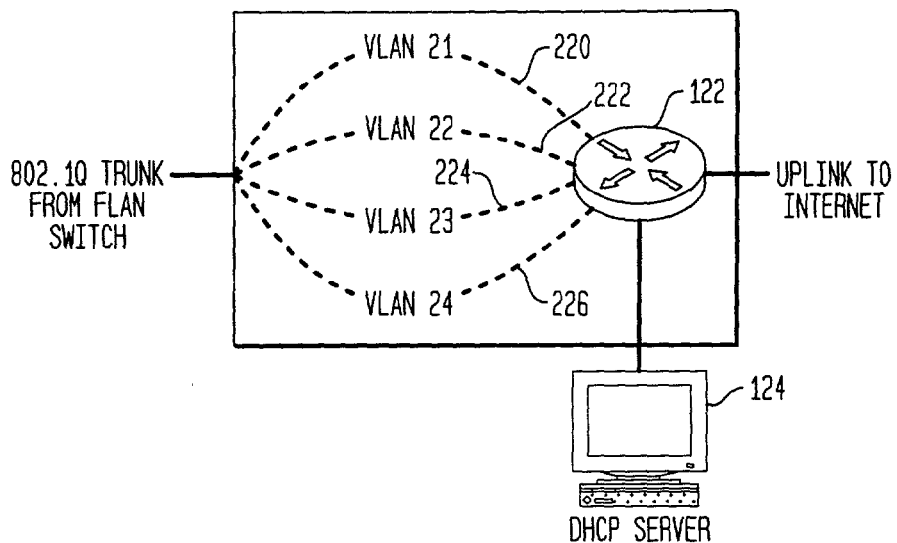
FIG. 5 shows an example of how the core VLANs are mapped to logical interfaces.

FIG. 5 shows an example of connecting the core VLANs (e.g., 204, 206, 208, 210 of FIG. 4) are mapped to logical interfaces 220, 222, 224, 226 on the router 122. In this example, each logical interface 220, 222, 224 226 is configured to provide DHCP relay; the DHCP server 124 uses the relay agent iP address (i.e., the giaddr field in the DHCP message body) to determine the appropriate IP subnet. Different sub-interfaces within the router 122, each corresponding to a different incoming VLAN, 220, 222, 224, 226 may be configured with different rules, e.g., for Internet access. For example, administrative users may be assigned to a separate administrative VLAN with access to servers that are not available to general users. The DHCP server may be modified to respond on a different VLAN, enabling the DHCP server to control VLAN assignment on the core side of the FLAN switch.

Figure 6:
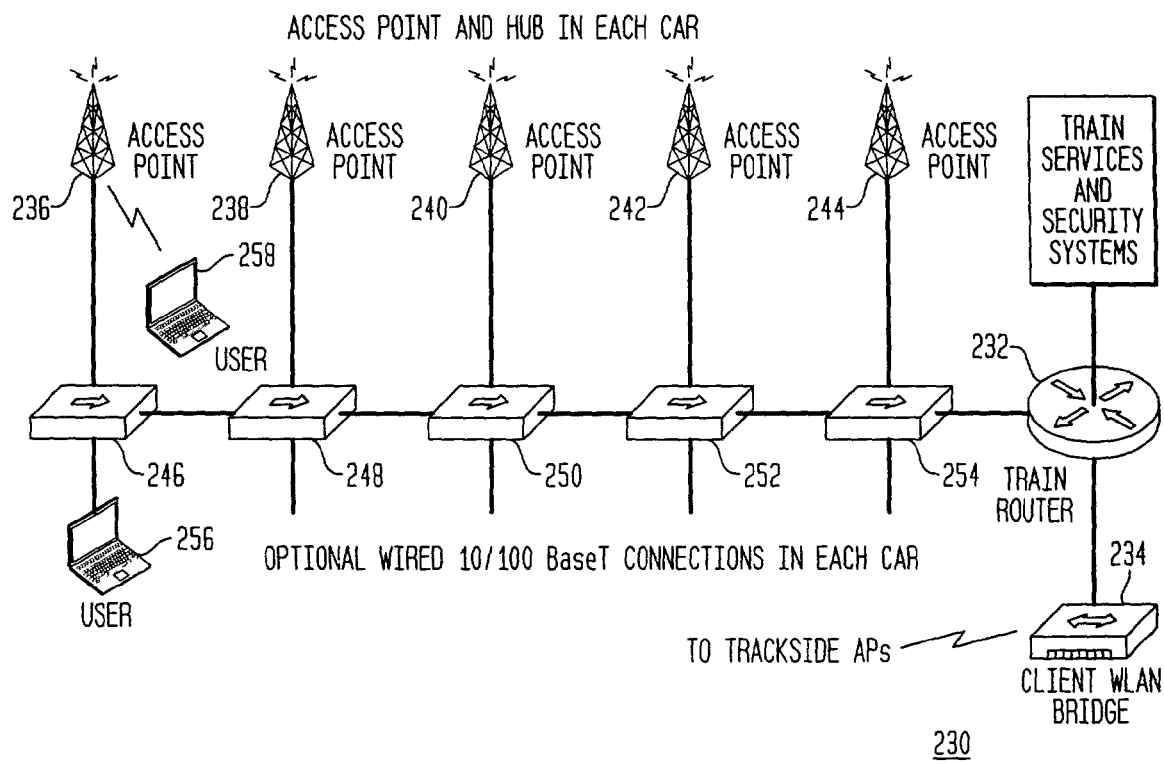
FIG. 6 shows an example of a train mounted FLAN providing on-train mobility for train passenger users.

FIG. 6 shows an example of a train mounted LAN 230, which may be an FLAN, providing on-train mobility for train passenger users. The train mounted LAN 230 may connect to a home station through trackside APs (corresponding to APs 106, 108, 110, 112, 114 and 116 in FIG. 1) using a Client WLAN/Ethernet bridge 234 through an off-the-shelf small Ethernet router 232.

Preferably, the client Wireless LAN bridge 234 provides a bridged connection between the train router port and the trackside Ethernet infrastructure. The client WLAN bridge 234 is connected to a medium gain omni-directional antenna system that may be mounted on the train exterior. The standard small router 232 can provide DHCP and basic connectivity on the train at very low cost. Further, while the train is moving between stations, only the train router MAC address is visible to upstream side of the FLAN switch (not shown in this figure). Thus, train passenger users are not affected by mobility events as the train moves from AP to AP. Optionally, back to back medium gain directional antennas aligned fore and aft may be mounted on the train. Each car may be equipped with standard 802.11b Access Points 236, 238, 240, 242, 244 depending upon antenna location, power and electrical noise. Daisy-chained Ethernet hubs 246, 248, 250, 252, 254 interconnect clients in the cars. The hubs 246, 248, 250, 252, 254 can also provide wired Ethernet connections at passenger seats. Preferably, all the train networking hardware is off-the-shelf, although the antenna and power systems are adapted for on-board train use as necessary.

In one rail application embodiment, wireless client devices 256, 258 are connected to an FLAN on the train and core FLAN APs are at the trackside. Local APs 236, 238, 240, 242, 244 on the train are hidden behind the mobile station or "client device" router 232. The router 232 acts as a gateway for all passenger users on the train, and router MAC address is attached to all outgoing packets. Preferably, the train router 232 uses layer 3 addresses to direct traffic to clients on the train. Again, the trackside core FLAN switch sees all train traffic arriving with the same MAC address. A single MAC address means a single table update whenever there is a mobility event due to the movement of the train.

In another rail application embodiment, each rail car has an internal network with wired Ethernet hubs for wired connections, an internal wireless access point and an external wireless client bridge connecting to trackside wireless access points. Thus, each rail car has an independent network and traffic may be bridged to the trackside network and FLAN switch as described hereinabove. Advantageously, this embodiment avoids the cost and complexity of a wired network between rail cars. Optionally, the client bridges can also provide communication between rail cars.

Thus, a preferred railway FLAN provides 2-10 Mbps Internet connections for passenger Internet access, train data services and for security. Passengers can connect to the on-board FLAN using either a standard wireless LAN card or a wired Ethernet connection. The separate dedicated wireless FLAN connection moves data between the train and trackside APs. Mobility between the trackside APs is provided by the FLAN. Application of the present invention to a very large rail network allows connection of hundreds of trains over thousands of kilometers of track to the same network.

Figure 7:
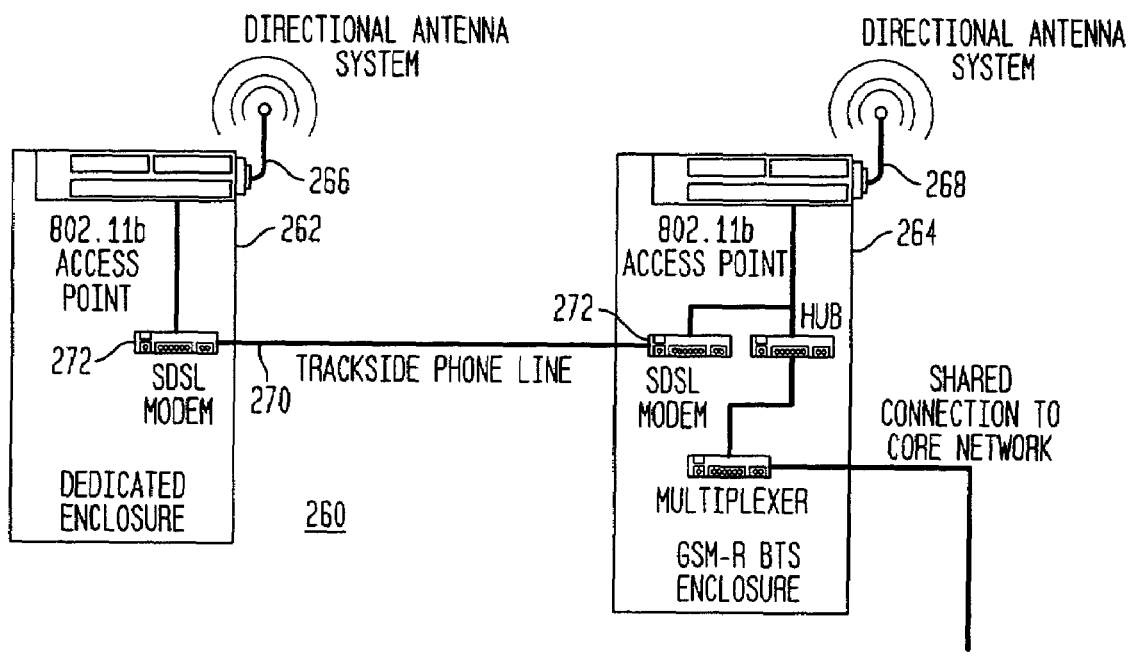
FIG. 7 is an example of a preferred trackside network.

FIG. 7 is an example of a preferred trackside or FLAN 260. In this example, the trackside 802.11b APs 262, 264 are normally co-located with an existing trackside system, in this example the global system for mobile communications-railway base receiver station (GSM-R BTSs) at trackside. The APs 262, 264 utilize directional WLAN antennas 266, 268 pointing along the track to achieve a 5-10 km range. Where GSM-R BTS locations do not afford full coverage, additional APs 262, 264 may be installed between the transceiver locations. Also, trackside copper telephone lines 270 and symmetric digital subscriber line (sDSL) modems 272 may be included to carry the data back to the GSM-R location.

Figure 8:
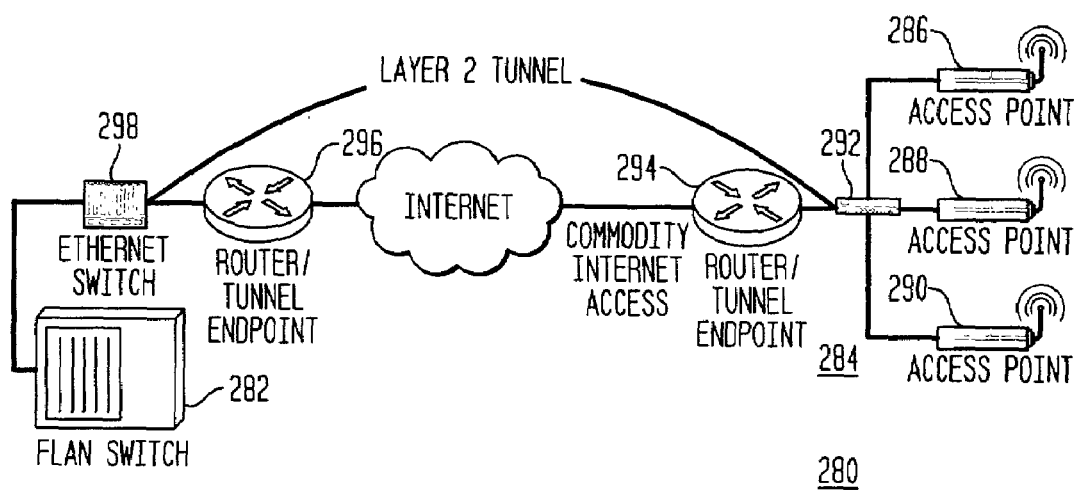
FIG. 8 is an example of tunneling traffic between an access network and a FLAN switch.

FIG. 8 is an example of a preferred FLAN 280 tunneling traffic between a FLAN switch 282 and an access network 284. Because the FLAN 280 is based on standard Ethernet protocol, it can easily be configured to tunnel Ethernet frames over most typical state of the art networks, e.g., SONET, ATM or IP networks. In this example, the access network 284 includes a group of APs 286, 288, 290 connected to hub 292. Hub 292 is connected to router 294, which connects through the Internet to router 296. Router 296 connects through Ethernet aggregation switch 298 to FLAN switch 282. Tunneling managed by routers 294, 296 may be used when it is otherwise impossible to share bandwidth, e.g., with a GSM-R BTS. Alternately, the tunneled traffic can be carried back to the FLAN switch 282 over a normal Internet connection, e.g., using a Cable Modem, xDSL or TDM.

Advantageously, the present invention facilitates creating large free-form wireless data networks, i.e., FLANs that permit end-user mobility. FLANs can be established anywhere, e.g., in airports, coffee shops, dense urban areas, and aboard trains and buses. Further, the present invention provides free-form wireless access using industry-standard wireless data technology, e.g., 802.11b and 802.11a. Typical available devices, equipped for wireless access, e.g., a laptop computer with an 802.11b card, enable clients to connect to the FLAN using Internet Protocol (IP) without regard to location, whether at the office, at home or traveling across country by rail. The FLAN is a simple and easy to manage network where existing client devices can "turn on and go" moving freely amongst AP reception areas without loading additional software or otherwise configuring the client device. A preferred embodiment FLAN may use standard, off-the-shelf equipment and, where customization is necessary, such customization may be confined to a single place in the network, the FLAN switch. Further, if desired, authorization and accounting (AAA) as well as other wireless security features may be included just as with any other state of the art network.

The present invention provides all of these advantages with a layer-two Ethernet network to interconnect the wireless access points. The usual scalability problems of such a network are avoided through a preferred application of IEEE 802.1Q Virtual LANs (VLANs) to effectively partition the network into many smaller networks, thus avoiding problems with broadcast traffic and spanning trees.

While the invention has been described in terms of preferred embodiments, those skilled in the art will recognize that the invention can be practiced with modification within the spirit and scope of the appended claims.

What is claimed is:

1. A network with wireless access capability comprising:
    a plurality of wireless access points;
    at least one Ethernet aggregation switch, ones of said plurality of access points being connected to each said at least one Ethernet aggregation switch, each said Ethernet aggregation switch being virtual LAN (VLAN) aware and matching client traffic from connected said access points with access VLANs;
    a free-form virtual network switch having at least one access port connected to each said at least one Ethernet aggregation switch and at least one core port, said free-form virtual network switch passing client traffic between access ports and core ports, said free-form virtual network switch further associating each frame of said client traffic with two VLANs, said two VLANs including an access VLAN at a respective said access port and an appropriate core VLAN at a respective core port;
    a router connected to a core port and routing traffic on core VLANs between said free-form virtual network switch and a public network;
    a dynamic host configuration protocol (DHCP) server managing connection between said free form virtual network switch and said public network; and
    a gateway providing access control, network address translation and firewall security at said public network.

2. A network as in claim 1, the free-form virtual network switch maintaining an association table between access VLANs and core VLANs.

3. A network as in claim 1 further comprising:
    at least one mobile station moving through access point reception areas, wireless connection with said network being continued with said at least one mobile station as said mobile station moves between reception areas.

4. A network as in claim 3, the free-form virtual network switch maintaining an association table between access VLANs and core VLANs and wherein as said mobile station moves between reception areas, said free form virtual network switch identifies each change of reception area and updates said association table for said each change.

5. A network as in claim 1 wherein at least two of said access points are connected to a hub forming an access point group, said hub connecting said access point group to said Ethernet aggregation switch.

6. A network as in claim 1, wherein the free-form virtual network switch comprises:
    a plurality of said access ports, each said at least one Ethernet aggregation switch connected to a respective one of said plurality of access ports; and
    said at least one core port is one core port, said free-form virtual network switch connecting to a router at said core port.

7. A network as in claim 6, the free-form virtual network switch maintaining an association table between said access VLANs at said plurality of access ports and said core VLANs at said core port.

8. A vehicle in wireless communication with a wireless network over access points located along a vehicle path of travel, said vehicle comprising:
    an on-board wireless LAN (WLAN) bridge connecting to pathside said access points;
    an on-board network including a free-form virtual network switch with a core port connected to said on-board WLAN bridge and at least one access port connected to on-board devices, said free-form virtual network switch further associating each frame of client traffic with two VLANs, said two VLANs including an access VLAN at a respective said access port and an appropriate core VLAN at a respective core port, said on-board devices connecting to a public network through said on-board network, said vehicle moving between reception areas of said pathside access points, client traffic being seamlessly routed between said public network and said on-board devices.

9. A vehicle as in claim 8 wherein said vehicle is a passenger train, said path is a train route and said on-board network comprises a plurality of on-board access points, passenger wireless devices on said train connecting to said on-board network through ones of said on-board access points.

10. A network with wireless access capability, said network comprising:

a plurality of wireless access points located trackside along train tracks;

at least one Ethernet aggregation switch, ones of said plurality of access points being connected to each said at least one Ethernet aggregation switch, each said Ethernet aggregation switch being virtual LAN (VLAN) aware and matching client traffic from connected said access points with access VLANs;

a free-form virtual network switch passing client traffic between said access VLANs at each said connected Ethernet aggregation switch and appropriate core VLANs;

at least one on-board device in a train moving through access point reception areas, wireless connection with said network being continued with said at least one on-board device as said train moves between reception areas; and an on-board network in said train connected to said on-board device, whereby on-board wireless devices connect to said network through said on-board network.

11. A network as in claim 10 wherein said on-board device is a client wireless LAN (WLAN) bridge connecting to trackside said access points.

12. A network as in claim 11 wherein said on-board network comprises a plurality of on-board access points, passenger wireless devices on said train connecting to said on-board network through ones of said on-board access points.

13. A network as in claim 9 wherein said on-board network further comprises:

at least one on-board Ethernet aggregation switch, ones of said on-board access points being connected to said at least one on-board Ethernet aggregation switch, each said on-board Ethernet aggregation switch being virtual LAN (VLAN) aware and matching client traffic from connected said on-board access points with one of said access VLANs; and an on-board free-form virtual network switch receiving client traffic from matched said access VLANs at each said connected on-board Ethernet aggregation switch and passing said client traffic to appropriate said core VLANs.

14. A passenger train in wireless communication with a wireless network over access points located along a train route, said passenger train comprising:

an on-board wireless LAN (WLAN) bridge connecting to pathside said access points;

an on-board network connected to said on-board WLAN bridge and on-board devices, said on-board devices connecting to a public network through said on-board network, said vehicle moving between reception areas of said pathside access points, client traffic being seamlessly routed between said public network and said on-board devices, said on-board network comprising a plurality of on-board access points, passenger wireless devices on said train connecting to said on-board network through ones of said on-board access points, said on-board network further comprising:

at least one on-board Ethernet aggregation switch, ones of said on-board access points being connected to said at least one on-board Ethernet aggregation switch, each said on-board Ethernet aggregation switch being virtual LAN (VLAN) aware and matching client traffic from connected said on-board access points with access VLANs, and an on-board free-form virtual network switch passing client traffic between matched said access VLANs at each said connected on-board Ethernet aggregation switch and appropriate core VLANs.

15. A passenger train as in claim 14, wherein the on-board free-form virtual network switch comprises:

a plurality of access ports, each said at least one on-board Ethernet aggregation switch connected to a respective one of said plurality of on-board access ports; and an on-board core port, said on-board free-form virtual network switch connecting to a router at said on-board core port.

16. A passenger train as in claim 15, the on-board free-form virtual network switch maintaining an association table between said access VLANs at said plurality of on-board access ports and said core VLANs at said on-board core port.

* * * * *